Dec. 29, 1931.    W. WIRTZ    1,838,125
SAWING IMPLEMENT
Filed Aug. 20, 1931
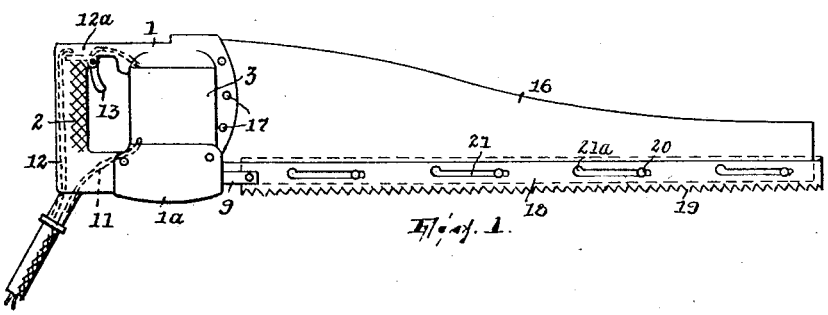
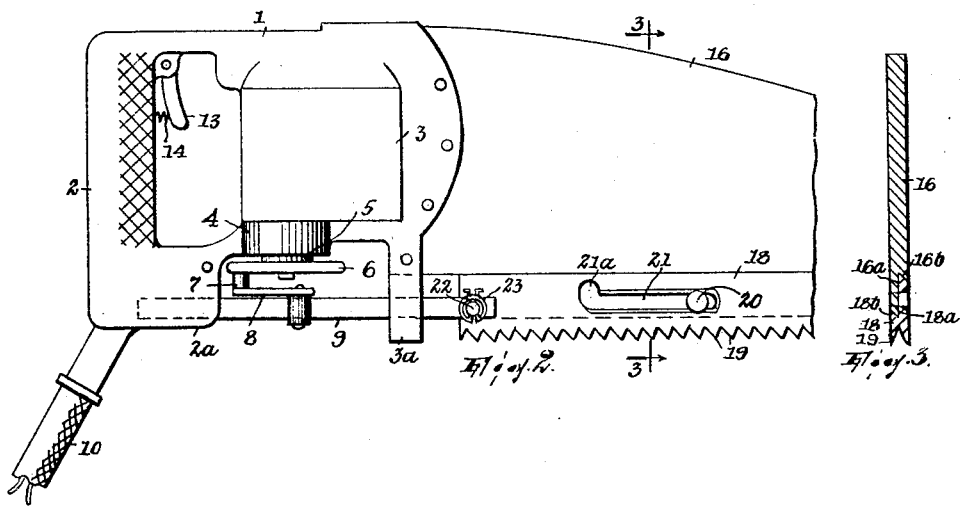
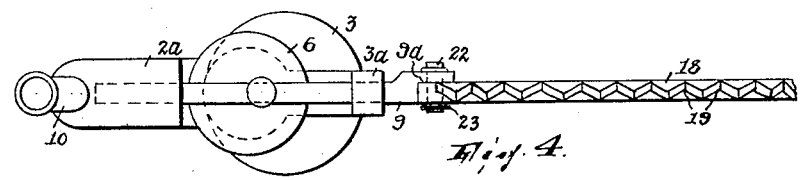
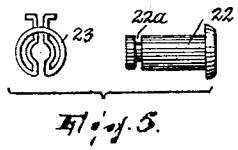
INVENTOR,
William Wirtz,
BY HIS ATTORNEY Patented Dec. 29, 1931

1,838,125

UNITED STATES PATENT OFFICE

WILLIAM WIRTZ, OF CRISTOBAL, PANAMA CANAL ZONE

SAWING IMPLEMENT

Application filed August 20, 1931. Serial No. 558,294.

This invention relates to sawing implements and it consists in certain improvements in implements of this class which have heretofore been proposed, to wit, comprising, with a fixed hand-gripped structure, a toothed or cutting sliding member to reciprocate on said structure and driving means for the sliding member arranged in the fixed structure. Heretofore no implement of this type has been devised, so far as I am aware, which could pass clear through the material being sawed without having the sliding member unbacked or unsupported for substantially its full length by the fixed structure (see U. S. Patent No. 1,592,999) or except where the sliding cutting member was duplicated, the two such sliding cutting members being arranged side by side and in a groove in the fixed structure provided for keeping them in this relation (see U. S. Patent No. 139,426). According to my invention the fixed hand-gripped structure has a fixed blade member and the sliding cutting member is arranged and maintained in the same plane as and in lapped relation to the fixed member and said members together form the blade of the implement and have their surfaces at each side of such blade substantially flush with each other, or at least the sliding member presents the maximum thickness of the blade. Thereby I provide a sawing implement that can pass clear through the material being sawed and in which the sliding member may be backed by the first member for substantially its entire length and considerable simplification of structure results and certain other advantages obvious to those skilled in the art follow. Other novel and advantageous features of my invention will appear hereinafter.

In the drawings,

Fig. 1 is a side elevation of the improved implement;

Fig. 2 is a side elevation on a larger scale of the handle end of the implement and showing a certain cover 1a removed;

Fig. 3 is a section on line 3—3, Fig. 2;

Fig. 4 is an underneath plan of what is shown in Fig. 2; and

Fig. 5 illustrates the parts of the coupling between the sliding member and its driving means.

1 designates the frame, which includes a suitable grip 2 and a casing 3. This may be formed as an integral structure, as shown, and the grip and casing are preferably formed with downward extensions 2a and 3a which serve as guides, as will appear.

The casing contains a motor 4, here an electric motor, whose rotary driving member 5 has its axis of rotation here so arranged that the wheel or face-plate 6 thereof lies in a plane perpendicular to that of the saw blade, said wheel being below the casing 3. The wheel has a wrist-pin 7 to which is pivoted a link 8 in turn pivoted to the reciprocating bar 9 which is confined in and by the guides 2a and 3a in a path extending lengthwise of the saw and perpendicularly to the axis of the driving member 5. The motor, its driving member, the link and bar are herein taken as the driving means. 1a is a cover provided for housing these parts.

The casing also contains means for starting and stopping the motor. The motor being electrically driven in the present instance, 10 is a cable extending from the frame 1 and comprising two conductors 11 and 12 connected to the respective terminals of the motor field and the latter of them including a pivoted trigger or switch 13 in permanent connection with one terminal at a break 12a in conductor 12 and adapted to be moved into contact with the other terminal at said break by the operator's forefinger to close the circuit and thereby drive the motor, 14 being a spring normally holding the switch out of contact with the latter terminal. The cable at its free end is of course to have its conductors connected to the terminals of a suitable source of electrical energy, as by plugging a suitable fitting on the cable into a convenient socket. The motor is started or stopped by application or release of pressure on the switch.

The blade as a whole has uniform thickness like the blade of an ordinary saw, this of course applying to the construction shown by way of example and as will appear. It comprises two blade members lying in the same plane. Member 16 is the fixed one and may be secured to the frame by rivets 17 or the like and it forms with said frame the fixed hand-gripped structure. The other member 18 is reciprocatory lengthwise of the saw and is a strip having its lower edge serrated, at 19, to form the saw teeth. At its lower edge on one side member 16 has a longitudinal rabbet 16a and at its upper edge on the relatively opposite side member 18 has a conforming rabbet 18a, the two thus-rabbeted edges being formed to fit each other and being each of such depth (here about half the thickness of the blade) that when they are assembled to form the blade their surfaces at each side of the blade are substantially flush with each other, or at least the sliding member presents the maximum thickness of the blade. The member 18 has sliding contact with the member 16 at the surfaces to which the lead-lines for the hereinafter mentioned reference characters 16b and 18b are applied, so that it is supported directly by member 16, thus avoiding wear on the means for maintaining them in the lapped relation which consists of headed studs 20 on member 16 received by longitudinal slots 21 of member 18 too narrow to permit the heads of the studs to pass therethrough, except as will be indicated; and I preferably also undercut each rabbet to form a groove 16b, 18b in which takes the adjoining edge of the opposite member, which is shaped to conform with and snugly fit the groove. The heads of the studs may be countersunk, as by bevelling the same and the sides of the slots, as shown in Fig. 2, so that said heads will not project to interfere with the passage of the blade through the material being sawed.

The member 18 is reciprocated by being connected to the bar 9 of the driving means. This connection is here such that the member 18 may be detached from the bar. The end of the bar is rabbeted, as at 9a, to receive the adjoining end of member 18 and through them is passed a headed stud 22 which has a circumferential groove 22a at its free end adapted to receive a spring clip 23; when this clip is detached from the stud the latter can be withdrawn to uncouple member 18 from the bar.

In order to render member 18 separable from member 16 each slot 21 has an enlarged extension 21a wide enough to permit the corresponding stud head to pass therethrough. The throw of the member 18 is preferably less than the over-all length of the slots so that when the member 18 is being driven the studs cannot engage in the slot-extensions, although upon uncoupling said member from bar 9 said member may be moved to the position where the studs will register with the extensions so as to detach said member.

My invention results in a sawing implement of the class indicated which will pass clear through the material and yet involves complete simplicity and is exceedingly strong and proof against undue wear. In practice I have found that the implement operates to better advantage when the sliding member is rapidly driven, as by omitting any gearing-down from the driver 5 to the bar 9.

A further novel feature of my invention is that each side of the sliding member forms with the corresponding side of the fixed member a side of the blade of the implement.

Having thus fully described my invention, I claim:

1. A sawing implement comprising a fixed hand-gripped structure having a fixed blade member, a sliding blade member arranged in the same plane as and lapping the fixed member and having its edge remote from the latter saw-toothed, means to maintain said members in lapped relation to each other, said members together forming a blade and the sliding member presenting the maximum thickness of the blade, and driving means for the sliding member arranged in the fixed member.

2. A sawing implement comprising a fixed hand-gripped structure having a fixed blade member, a sliding blade member arranged in the same plane as the fixed member and having its edge remote from the latter saw-toothed, the adjoining edge portions of said members being rabbeted and each such rabbet of one member receiving the rabbeted edge portion of the other, means to maintain said members in lapped relation to each other, said members together forming a blade and the sliding member presenting the maximum thickness of the blade, and driving means for the sliding member arranged in the fixed member.

3. A sawing implement comprising a fixed hand-gripped structure having a fixed blade member, a sliding blade member arranged in the same plane as the fixed member and having its edge remote from the latter saw-toothed, the adjoining edge portions of said members being undercut-rabbeted and each such rabbet of one member receiving in its undercut the rabbeted edge portion of the other, means to maintain said members in lapped relation to each other, said members together forming a blade and the sliding member presenting the maximum thickness of the blade, and driving means for the sliding member arranged in the fixed member.

4. A sawing implement comprising a fixed hand-gripped structure having a fixed blade member, a sliding blade member arranged in the same plane as and lapping the fixed member and having its edge remote from the latter saw-toothed, one member having a slot extending lengthwise of the sliding motion of the sliding member and the other member having a headed stud received by the slot and normally maintaining said members in lapped relation to each other, and driving means, disconnectively connected to the sliding member, for driving the latter and arranged in the fixed member, said slot having an enlargement permitting passage of the stud head therethrough to detach the sliding member from the fixed member.

In testimony whereof I affix my signature.

WILLIAM WIRTZ.